United States Patent [19]

Hatten

[11] Patent Number: 4,600,037

[45] Date of Patent: Jul. 15, 1986

[54] FLEXIBLE DRILL PIPE

[75] Inventor: James L. Hatten, Houston, Tex.

[73] Assignee: Texas Eastern Drilling Systems, Inc., Houston, Tex.

[21] Appl. No.: 750,184

[22] Filed: Jul. 1, 1985

Related U.S. Application Data

[63] Continuation of Ser. No. 590,789, Mar. 19, 1984, abandoned.

[51] Int. Cl.⁴ .............................................. D03D 21/00
[52] U.S. Cl. ................................... 138/120; 138/155; 138/162; 175/320
[58] Field of Search .............. 138/128, 155, 162, 166; 175/61, 75, 82, 320; 285/330; 64/15, 2 R

[56] References Cited

U.S. PATENT DOCUMENTS

| | | | |
|---|---|---|---|
| 338,310 | 3/1886 | Smith | 138/120 X |
| 2,694,549 | 11/1954 | James | 175/82 |
| 2,712,436 | 7/1955 | McCune et al. | 175/82 X |
| 2,739,089 | 3/1956 | Hageltorn | 285/330 X |
| 4,328,839 | 5/1982 | Lyons et al. | 138/155 X |
| 4,343,369 | 8/1982 | Lyons et al. | 175/75 |
| 4,388,488 | 6/1983 | Wlcek et al. | 138/166 X |

Primary Examiner—James E. Bryant, III
Attorney, Agent, or Firm—Vinson & Elkins

[57] ABSTRACT

A flexible drill pipe adapted for connection in a drill string, having sufficient wall thickness in order to withstand forces imposed by drilling a well. The flexible pipe has a plurality of cuts defining interlocking teeth and recesses on axially adjacent segments of the pipe, the teeth in one segment being positioned in the recesses of, and interlocking with the teeth of, the adjacent segment. Each of the teeth includes a generally semicircular crown section, two essentially flat shoulders and a tapered base portion, with the curved, tapered sides of circumferentially adjacent bases forming the semicircular recesses for receiving the crowns of axially adjacent interlocking teeth.

18 Claims, 3 Drawing Figures

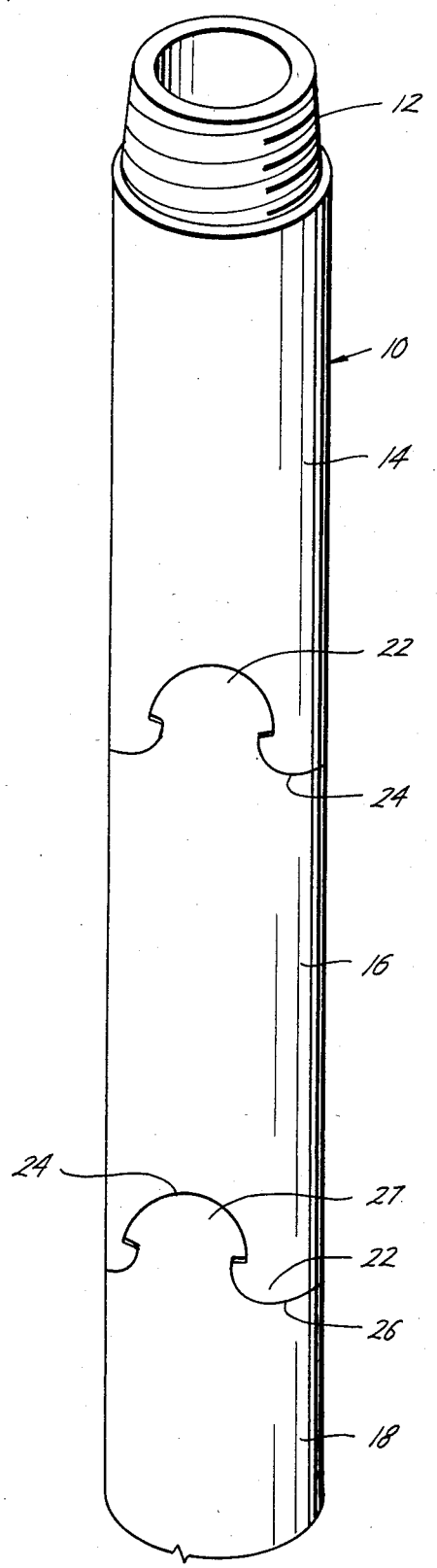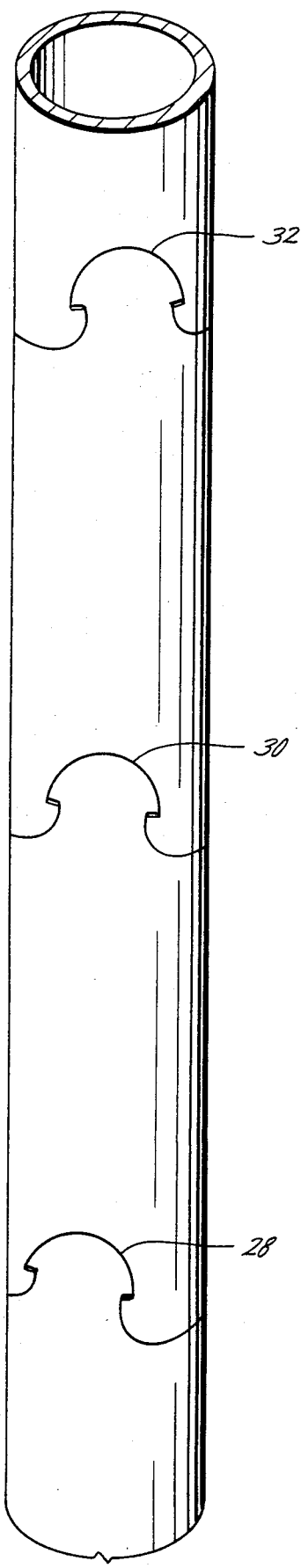

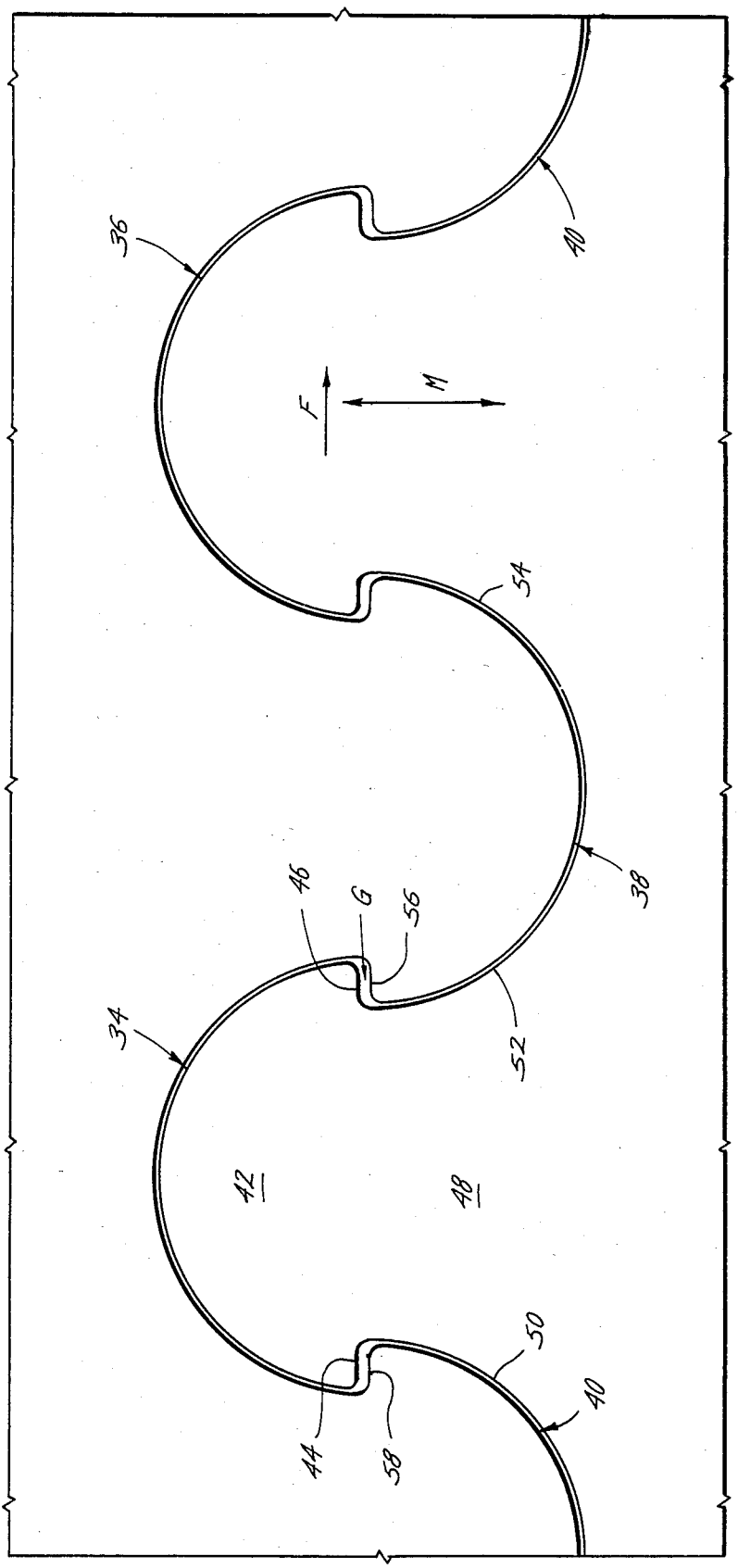

FLEXIBLE DRILL PIPE

This is a continuation of application Ser. No. 06/590,789 filed Mar. 19, 1984, now abandoned.

BACKGROUND OF THE INVENTION

1. Field of the Invention

The present invention relates to a segmented, flexible drill pipe having an improved configuration for the interlocking segments.

2. Prior Art

In drilling deviated well bores it is necessary to use drill pipe that can bend through the curve of deviation from the vertical. There have been a number of proposals for segmenting regular drill pipe to make the pipe bend without permanently distorting the pipe. For example, U.S. Pat. No. 2,515,366, issued to John A. Zublin, teaches forming a plurality of generally circumferential slots, each cut through the wall of a tubular drill pipe, so that the pipe is divided into a plurality of sections.

While the slots are generally circumferential, they deviate from a true circumference to form a plurality of interengaging and loosely interlocking teeth having a dovetail configuration. The tops and sides of each dovetail configuration, in the Zublin patent, are each relatively straight. Further, Zublin's dovetail cuts are vertically true, each being straight in line with the next.

It has been found that the straight sides of the Zublin dovetail cut allow excessive distortion in bending the drill pipe and often cause damage to the cut if excessive force is applied at the bend. Sometimes, on heavy-duty rotation of the drill pipe, the pipe will fail at a particular stress-weakened cut. This has been attributed to the vertical alignment, as well as the straight sides of the cuts.

In U.S. Pat. No. 4,328,839, there is shown a modified flexible drill pipe in which the sides of the interlocking teeth are formed in reversed intersecting semicircles to provide an improved force bearing action between adjacent teeth upon bending of the flexible drill pipe. However, it has been found that this configuration, while providing improved characteristics over the *Zublin* type drill pipe, nevertheless is subject to excessive elongation, and potential failure, upon substantial axial loading because of the absence of a positive stop between adjacent segments to prevent excessive axial distortion. Further, this configuration remains subject to potential breakage upon excessive bending because of the relatively narrow neck portion at the base of each of the interlocking teeth, the configuration being such that the tooth is narrowest, and therefore weakest, at the point where it is subject to the greatest concentration of bending moment forces.

Various other configurations of segmented drill pipes are shown in U.S. Pat. Nos.:

2,382,933 to Zublin;
2,515,366 to Zublin;
2,585,207 to Zublin;
2,687,282 to Sanders;
2,694,549 to James;
3,160,218 to Crake;
3,903,974 to Cullen; and
4,067,404 to Crase.

Therefore, it is an object of the present invention to provide an improved flexible drill pipe by providing a unique configuration for interlocking teeth thereof.

It is a further object to provide increased rotational strength and tension strength in a flexible drill pipe.

Another object is to provide improved bending of the flexible drill pipe while retaining integrity of the interlocking teeth.

Another object is to provide a positive lock against excessive axial displacement between adjacent pipe segments of the flexible drill pipe.

Yet another object is to provide improved rotational strength of the drill pipe by providing an offset to each succeeding cut forming the interlocking teeth.

Another object is to provide such a flexible drill pipe with improved bearing characteristics between adjacent segments to reduce wear and improve the life of the drill pipe.

SUMMARY OF THE INVENTION

A flexible pipe comprising an elongated tubular member subdivided into a plurality of segments of rigid pipe of substantial wall thickness in end-to-end relationship with a plurality of interlocking teeth and complementary recesses on each end of the intermediate segments, the teeth of one segment being positioned in the recesses and interlocking the teeth of the adjacent segment with sufficient clearance to form a joint permitting limited relative movement in any direction between the segments, each of said teeth having an arcuate crown portion, a tapered base portion and a substantially flat shoulder area between the crown and base portions.

The above and other objects and features of the invention will be apparent to those skilled in the art after a consideration of the following detailed description taken in conjunction with the accompanying drawings in which a preferred embodiment of the invention is shown.

BRIEF DESCRIPTION OF THE DRAWINGS

FIG. 1 is a perspective view of a portion of a flexible drill pipe segmented using the improved interlocking teeth configuration of the present invention.

FIG. 2 is a perspective view of a portion of the drill pipe of the present invention illustrating the offset of each succeeding cut forming the teeth and complementary recesses.

FIG. 3 is a laid-out section of a portion of the flexible drill pipe of the present invention in template form, showing in enlarged detail the interlocking teeth configuration of adjacent segments of the pipe.

DESCRIPTION OF THE PREFERRED EMBODIMENTS

The flexible drill pipe of the present invention is particularly useful in aiding in the drilling of lateral bores deviating from a vertical bore hole. The particular interlocking tooth cut, described hereinafter, is well adapted for resisting the compressive, bending and torque stresses encountered in drilling bore holes.

In drilling lateral bores from a vertical bore hole, the drill pipe must be capable of bending through the radius of an arc to enter the lateral bore hole and then resume an essentially straight configuration for subsequent straight drilling. In operation, the drill pipe string consists of both regular drill pipe and flexible drill pipe.

Reference is made to U.S. Pat. No. 4,343,369 entitled "Apparatus for Drilling Straight Portion of a Deviated Hole," which discloses guide of the type normally used in conjunction with the flexible pipe of the present invention. In that patent, the flexible drill pipe is referred to as a "drive pipe." As taught in such patent, a plurality of flexible drill pipes would be used to make up a portion of the drill string, with at least one of the flexible drill pipes being received and housed within the bore of the drill guide. The drill pipe terminating in the drill guide carries a drill bit for cutting the bore hole. The drill guide is adapted for guiding the direction of drilling and does not rotate with the flexible drill pipe of the present invention.

Referring now to FIG. 1, there is illustrated perspectively a portion of a flexible drill pipe 10 comprising an elongated tubular member subdivided into a plurality of segments 14, 16 and 18. The drill pipe 10 is preferably of rigid construction having a substantial wall thickness to withstand the compressive, bending and torque stresses encountered in drilling bore holes.

The segments 14, 16 and 18 are representative of the drill pipe 10 which has means 12 on each end thereof for connection with another drill pipe. The connection means 12 shown in FIG. 1 is a threaded pin end portion. A threaded box end portion would normally be provided on the opposite end of the pipe. The threaded segments of the drill pipe 10, such as the pin end segment 14, are interconnected to a plurality of intermediate segments, such as segment 16, which is representative of all other intermediate segments, and which are arranged in end-to-end relationship.

Each end of each intermediate segment 16 has a plurality of teeth 22 and complementary recesses 124. The teeth 22 of one segment 16 being positioned in the recesses 26 and interlocking the teeth 27 of the adjacent segment 18 with sufficient clearance to form a joint permitting relative movement in any direction between the segments 16 and 18.

The width of the cut forming the teeth 22 and recesses 24 configuration is preferably sufficient to permit the segments of the flexible drill pipe 10 to have radial and axial relative movement with each other. As torque is applied to the drill pipe 10 in drilling, one side of the teeth of one section of the pipe will move into contact with the sides of the teeth in the next axially adjacent segment and so on to transmit the torque through the length of the drill pipe while the gaps or clearances between the segments will permit limited bending or flexing of the overall pipe to accommodate a relatively sharp bend in the well bore. It will be apparent to one skilled in the art that the amount of overall bending of the pipe 10 will be determined by the number of individual segments, as well as the size of, and clearances between, the interlocking teeth forming the segments. These parameters therefore may be varied to accomplish the result desired by the designer of the pipe.

Preferably, the flexible drill pipe 10 of the invention is manufactured by cutting through the wall thickness of a conventional drill pipe to form the interlocking teeth and segments of the flexible drill pipe. While other methods of manufacture may be available in the industry, it has been found that by using a commercially available drill pipe as the basic tubular member, the desired end product is achieved. This also provides a tubular member having sufficient wall thickness to give the teeth the strength to resist the stresses that will be placed on them in drilling.

The present invention particularly resides in the novel configuration of the means for interlocking the adjacent segments 16 and 18 of the drill pipe 10. The teeth 22 and recesses 24 are formed by a cut through the wall thickness of the pipe 10, which cut is made so as to form the teeth 34, 36, 38 and 40, as illustrated in FIG. 3, and complementary recesses.

As shown most clearly in FIG. 3, each of the teeth 34, 36, 38 and 40 is identical, comprising a semicircular crown portion 42, two substantially flat shoulders 44 and 46 lying along the circumferential direction of the drill pipe 10, and a tapered base 48 which extends downwardly in the axial direction and outwardly in the circumferential direction from the tooth crown 42. The diameter of the semicircular crown 42 is disposed in a direction generally circumferential of the pipe 10, while the arc forming the semicircle extends in a direction generally axial of the pipe 10. The shoulders 44 and 46 lie along the outer ends of the diameter of the semicircle forming the crown portion 42 with the top of the base 48 comprising the remainder of the diameter.

Tapered sides 50 and 52 of the base 48 comprise opposed, approximately 90° arcs, so that the adjacent tapered sides 52 and 54 of circumferentially adjacent teeth 34 and 36 on one segment form a continuous semicircular recess for receiving the semicircular crown portion of the opposed tooth 38 on the next axially adjacent pipe segment. Therefore, upon axial compression of the segmented pipe, each of the semicircular tooth crowns will be in engagement with a corresponding semicircular recess on the next axially adjacent pipe segment to provide a ball and socket-type of bearing surface and distribute the compressive forces over a relatively large area. Since most of the work performed with the segmented drill pipe during drilling activity occurs under compression, this configuration greatly reduces the wear on the teeth by providing a smooth bearing surface and maximizing the area over which the compressive and sliding forces are distributed.

The configuration of the present invention also eliminates the possibility of undue elongation of the drill pipe 10 under tension, which could result in jamming of the teeth between adjacent segments, or separation between segments. When the drill pipe 10 is under tension, the opposed essentially flat shoulders 44 and 46 on tooth 34 are adapted to engage the opposed shoulders 56 on tooth 38 and 58 on tooth 40, to provide a positive stop against excessive further axial displacement of the pipe segments relative to each other. It will be appreciated that the clearance between the opposed shoulder portions will limit the relative pivotal movement of adjacent pipe segments and thereby the overall curvature which the pipe 10 may achieve in use. Therefore, the clearance between the teeth and complementary recesses is preferably substantially greater in the direction axial to the pipe, than in the direction circumferential of the pipe, the difference being represented by the gap G formed between opposed tooth shoulder areas. The dimension of the gap G will control the amount of elongation of the segmented pipe under tension, as well as the relative pivotal movement of adjacent pipe segments, and thereby the overall curvature of the entire segmented drill pipe.

In order to avoid the concentration of large forces in a small area, it is preferable that the clearances between the teeth and recesses, including the dimension of the gap G, be such that the opposed shoulders 44 and 56, or 46 and 50, do not engage during the maximum curvature which the drill pipe 10 is expected to attain during drilling operations. Rather, it is desired that essentially all of the compressive and torque forces generated during use of the drill pipe 10 be carried along the smooth semicircular interfaces between the tooth crowns and the complementary recesses formed by the tapered bases of circumferentially adjacent teeth on the axially adjacent segments.

As shown most clearly in FIG. 3, it is also desirable to round the edges of the teeth at the junctures between the shoulder and crown portions, and between shoulder and tapered base portions, to provide for smooth flexing action and to minimize the possibility of point-type force concentrations which could damage the structure.

The configuration of the improved teeth of the pipe also provides increased resistance to tooth breakage. It will be appreciated that the bending moment forces exerted on the teeth as the pipe segments pivot relative to each other, will have a substantial circumferential component. Similarly, the torque transmitted through the drill pipe in order to rotate the drill bit at the end of the pipe string will exert a circumferential force on the individual teeth of the pipe segments. These forces, represented by the arrow F in FIG. 3, will be greater near the base of the tooth because of the elongation of the moment arm M. However, with the present configuration, the thickness of the tooth base increases as the moment arm elongates because of the tapered base configuration, thereby providing greatest structural strength at the base of the tooth rather than at its crown as shown in prior art configurations such as U.S. Pat. Nos. 2,515,366 and 4,328,839.

When the ends of the templated FIG. 3 are joined, there is formed a tubular section representative of the generally circumferential interlocking connection between adjacent segments of the flexible drill pipe 10. In the preferred embodiment of the invention, each end of each segment of the flexible drill pipe has two teeth 34 and 36 and two complementary recesses separating the teeth 34 and 36 from each other. It has been found that this two-teeth configuration, with the complementary semicircular recesses between the teeth, permits a ball and socket-type action on compressive flexing, which permits maximum deflection while also maximizing strength and durability of the pipe.

To further distribute the working forces in the segmented pipe, it is preferable that the two teeth formed on one end of a pipe segment be offset in either direction from the complementary recesses on the opposite end of the drill pipe segment. In the preferred embodiment, the teeth and recesses in each segment are offset in a counterclockwise direction by approximately 12° for each pipe segment. This is particularly illustrated in FIG. 2, where there are shown four interconnections of segments of the flexible drill pipe 10 with each of the interconnections of teeth and recesses 28, 30 and 32 being offset, in counterclockwise rotation, from the next preceding interconnection.

The foregoing description and disclosure of the invention is by way of example only, and various changes may be made in the size and shape of parts, materials of construction and other details within the scope of the appended claims without departing from the spirit of the invention.

I claim:

1. A flexible pipe comprising:
    an elongated tubular member subdivided into a plurality of segments of rigid pipe of substantial wall thickness in end-to-end relationship with a plurality of interlocking teeth and complementary recesses on each end of the segments intermediate the ends of said tubular member, the teeth of one segment being positioned in the recesses of, and interlocking the teeth of, the adjacent segment with sufficient clearance to form a joint permitting limited relative movement between the segments,
    each of said teeth comprising an arcuate crown portion with its arc extending generally axially of said pipe, a tapered base portion and a substantially flat shoulder area extending between said crown and base portions in a direction generally circumferentially of said pipe.

2. The flexible pipe according to claim 1 wherein said arcuate crown comprises substantially a semicircle.

3. The flexible pipe according to claim 1 wherein there are two substantially flat shoulder area between said crown and base portions.

4. The flexible pipe according to claim 1 wherein said tapered base portion of each tooth has substantially arcuate sides, the circumferentially adjacent arcuate sides of circumferentially adjacent teeth forming complementary recesses for receiving the arcuate crowns of the corresponding teeth on axially adjacent segments of said pipe.

5. The flexible pipe according to claim 4 wherein said tapered sides on each tooth comprise opposed approximately 90° arcs.

6. A flexible pipe comprising:
    an elongated tubular member subdivided into a plurality of segments of rigid pipe of substantial wall thickness in end-to-end relationship with a plurality of interlocking teeth and complementary recesses on each end of the segments intermediate the ends of said tubular member, the teeth of one segment being positioned in the recesses of, and interlocking the teeth of, the adjacent segment with sufficient clearance to form a joint permitting limited relative movement between the segments,
    each of said teeth having an arcuate crown portion with its arc extending generally axially of said pipe, a tapered base portion, with said tooth having its greatest circumferential dimension where said base portion of such tooth is attached to the body of said pipe segments of which said tooth is a part, and a shoulder area,
    the shoulder areas of the teeth in one pipe segment being adapted to engage the shoulder areas of the teeth in the adjacent pipe segment to thereby limit the amount of angular rotation and the amount of axial movement of said pipe segments relative to each other.

7. The flexible pipe according to claim 6 wherein opposed shoulder areas on the teeth of adjacent pipe segments of said flexible pipe are spaced from each other axially by a distance which permits said pipe segments to move axially relative to each other by a greater amount than they can move circumferentially relative to each other.

8. The flexible pipe according to claim 6 wherein the amount of overall curvature of said flexible pipe is controlled by the amount of spacing between opposed shoulder areas on the interlocked teeth of said adjacent pipe segments.

9. The flexible pipe according to claim 6 wherein the crown comprises substantially a semicircle and the sides of said base each comprise substantially 90° circular arcs.

10. A flexible pipe comprising:
    an elongated tubular member subdivided into a plurality of segments of rigid pipe of substantial wall thickness in end-to-end relationship with a plurality of interlocking teeth and complementary recesses on each end of the segments intermediate the ends of said tubular member, the teeth of one segment being positioned in the recesses of, and interlocking the teeth of, the adjacent segment with sufficient clearance to form a joint permitting limited to relative movement between the segments, each of said teeth having a semicircular crown portion, with the base of said semicircle extending generally circumferentially of said pipe, and the arc of said semicircle extending generally axially of said pipe, two shoulder portions at opposed outer ends of the base of said semicircle, and a base portion tapering generally downwardly in an axial direction and outwardly in a circumferential direction.

11. The flexible pipe of claim 10 wherein there are two teeth and two complementary recesses on each end of the intermediate segments of said pipe.

12. The flexible pipe of claim 10, wherein each plurality of teeth formed on one end of each segment of pipe is offset in counterclockwise rotation from the plurality of complementary recesses on the opposite end of the pipe segment.

13. The flexible pipe of claim 12, wherein there are two teeth and two complementary recesses on each end of the intermediate segments of said pipe.

14. The pipe of claim 10, wherein the clearance between said teeth and said complementary recesses is substantially greater in the axial direction than in the circumferential direction.

15. The pipe of claim 10, wherein the adjacent edges of the tapered base portions of adjacent teeth on one segment form a semicircular recess for receiving the semicircular crown portion of the corresponding tooth of the next axially adjacent segment of said pipe.

16. The pipe according to claim 10, wherein each shoulder portion of each tooth on one pipe segment is adapted to engage a shoulder portion of a tooth on the next axially adjacent pipe segment to provide a stop against excessive axial displacement of the segments relative to each other.

17. A flexible pipe comprising an elongated tubular member adapted for connection in a drill string, having sufficient wall thickness in order to withstand forces imposed by drilling a well, said tubular member being subdivided into a plurality of segments, each of essentially equal length, with two interlocking teeth and complementary recesses on each end of the segments intermediate the ends of said tubular member, the teeth of one segment being positioned in the recesses of, and interlocking the teeth of, the adjacent segment with sufficient clearance to form a joint permitting limited radial and axial movement between the segments, each of said teeth having a semicircular crown portion, with the base of said semicircle extending generally circumferentially of said pipe, and the arc of said semicircle extending generally axially of said pipe, two shoulder portions at opposed outer ends of the base of said semicircle, and a base portion tapering generally downwardly in an axial direction and outwardly in a circumferential direction.

18. The flexible pipe of claim 17, wherein each pair of teeth formed on one end of each segment of pipe is offset, in counterclockwise rotation, from the pair of complementary recesses on the opposite end of said pipe segment.

* * * * *